United States Patent
Daniel et al.

[15] 3,704,575
[45] Dec. 5, 1972

[54] FLAIL-TYPE IRRIGATION DITCH CLEANER

[72] Inventors: Martin L. Daniel, 2409 Hanson Drive, Missoula, Mont. 59801; George E. Sacks, Carvallis, Mont. 59828

[22] Filed: Jan. 26, 1971

[21] Appl. No.: 109,828

[52] U.S. Cl. ............56/12.7, 56/14.9, 56/15.3, 56/15.5, 56/504
[51] Int. Cl. ...........................A01d 49/00
[58] Field of Search.........56/8, 12.7, 6, 7, 14.9, 15.3, 56/15.5, 229, 289, 504, 505, 192

[56] References Cited

UNITED STATES PATENTS

| | | | |
|---|---|---|---|
| 3,005,301 | 10/1961 | Sammarco | 56/12.7 |
| 2,501,925 | 3/1950 | Yensen et al. | 56/12.7 |
| 3,181,619 | 5/1965 | Smith et al. | 56/15.5 X |
| 2,560,641 | 7/1951 | Goodlet | 56/15.5 X |
| 3,563,011 | 2/1962 | Bramley et al. | 56/7 |
| 2850,863 | 9/1958 | Pierson et al. | 56/192 |

FOREIGN PATENTS OR APPLICATIONS

| | | | |
|---|---|---|---|
| 260,668 | 5/1963 | Australia | 56/504 |
| 199,415 | 2/1958 | Austria | 56/12.7 |

*Primary Examiner*—Louis G. Mancene
*Assistant Examiner*—J. A. Oliff
*Attorney*—Clarence A. O'Brien and Harvey B. Jacobson

[57] ABSTRACT

An elongated frame for horizontal positioning transversely of and above a ditch to be cleaned and movement along the ditch. An elongated support member is disposed lengthwise of and journalled from a lower portion of the frame and an elongated flexible flail member is provided with the opposite ends of the flexible flail member and the rotatable support member including coacting structure for removably anchoring the opposite ends of the flail member to selected longitudinally spaced portions of the elongated support member, whereby a flail of generally U-shaped configuration may be swung rapidly about the axis of rotation of the elongated support member from which the flail is supported.

8 Claims, 5 Drawing Figures

PATENTED DEC 5 1972

Martin L. Daniel
George E. Sacks

INVENTORS

BY *Clarence A. O'Brien*
and *Harvey B. Jacobson*
Attorneys

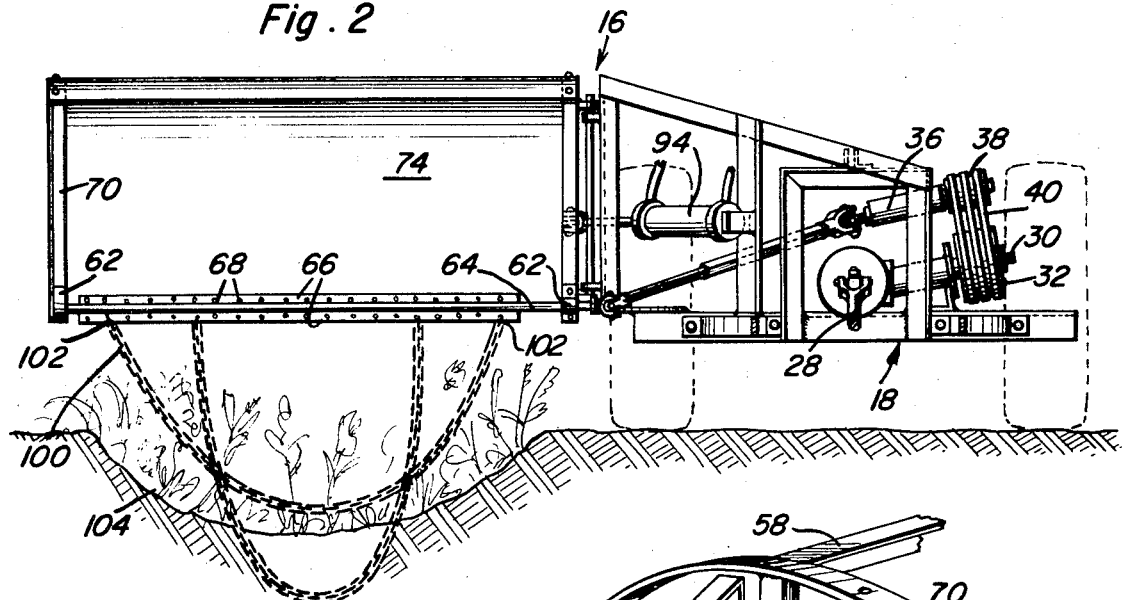
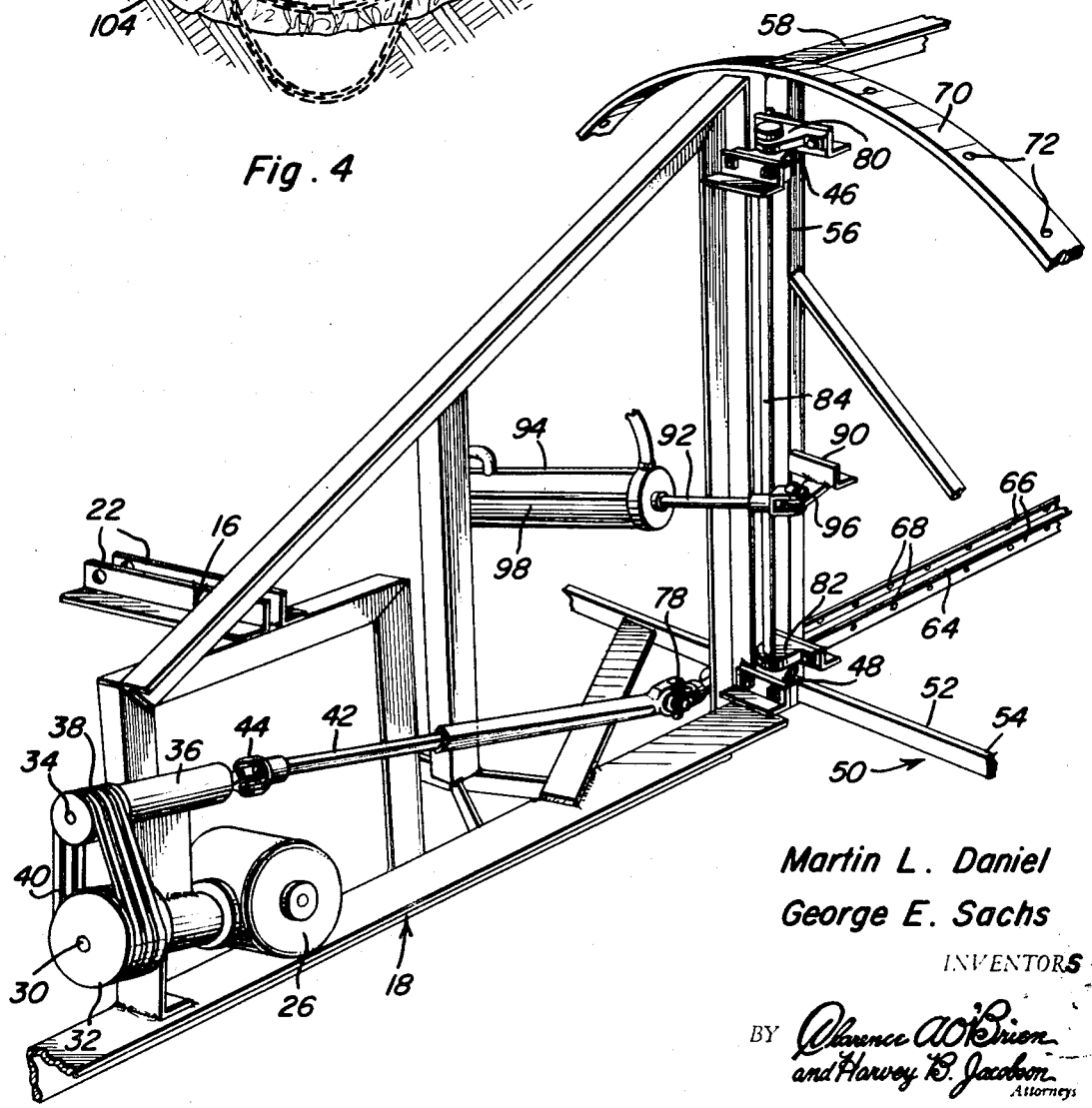

FLAIL-TYPE IRRIGATION DITCH CLEANER

The ditch cleaner of the instant invention has been specifically designed to provide a means whereby irrigation and other ditches may be cleaned of vegetation growing therein. The ditch cleaner supports a flexible U-shaped flail for rotation about a horizontal axis extending transversely of and disposed above the ditch to be cleaned with the U-shaped flail extending along and opening toward the axis about which it is swingable. Furthermore, the ditch cleaner includes structure coacting with the opposite ends of the flail member for adjustably varying the spacing between the ends of the U-shaped flail member, thereby rendering the ditch cleaner adaptable to clean narrow deep ditches as well as wide shallow ditches of vegetation.

The ditch cleaner has been further specifically designed for support from a conventional farm tractor and from the three-point hitch of the tractor whereby the elevation of the horizontal axis about which the flail member is swingable may be adjusted vertically. However, the ditch cleaner may be readily adapted for support from other types of vehicles for possible use in other environments such as highway maintenance. In addition, the ditch cleaner may be provided with a plurality of flails supported for swinging in generally equally circumferentially spaced positions about the axis relative to which the flail members are swingable.

The main object of this invention is to provide a ditch cleaner that will be capable of being readably adjusted for cleaning narrow ditches as well as wide ditches and ditches of both types that are either deep or shallow.

Another important object of this invention is to provide a ditch cleaner that may be readily supported from and driven by a conventional farm tractor.

A further object of this invention, in accordance with the immediately preceding object, is to provide a ditch cleaner of the horizontally laterally outwardly projecting type and including a supporting structure enabling the normally horizontally outwardly projecting portion of the cleaner to be swung to a horizontally and rearwardly projecting position relative to a supporting tractor thereby enabling the tractor, with the ditch cleaner supported therefrom, to pass through narrow gateways.

Still another object of this invention is to provide a flail-type ditch cleaner having a mounting portion constructed in a manner enabling it to be readily supported from various types of three-point tractor hitches.

A final object of this invention to be specifically enumerated herein is to provide a flail-type ditch cleaner in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a fragmentary transverse vertical sectional view, taken substantially upon the plane indicated by the section line 2—2 of FIG. 1;

Figure 5:
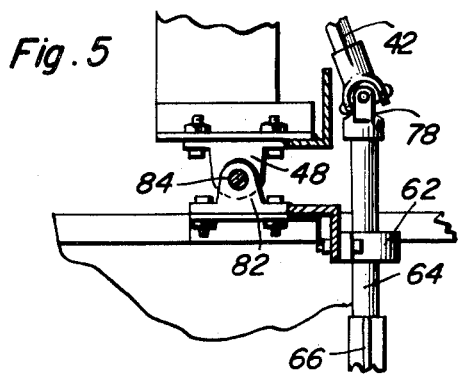

FIG. 4 is a fragmentary perspective view of the supporting frame portion of the ditch cleaner illustrating the manner in which the swingable cleaner head is supported therefrom for oscillation about a vertical axis; and FIG. 5 is an enlarged fragmentary horizontal sectional view illustrating a portion of the articulated drive connection by which the tractor power take-off is drivingly connected to the rotatable member of the ditch cleaner.

Referring now more specifically to the drawings, the numeral 10 generally designates a conventional form of farm tractor including a power take-off shaft 12 and an implement hitch of the lift type referred to in general by the reference numeral 14.

The ditch cleaner of the instant invention is referred to in general by the reference numeral 16 and includes a support frame referred to in general by the reference numeral 18 supported from the lower arms of the hitch 14 by means of a pair of forwardly projecting brackets 20 carried by a lower portion of the support frame 18 and upper angle iron members 22 of the support frame 18 secured to an upper arm (not shown) of the hitch 14.

The rear end of the power take-off shaft 12 is drivingly coupled to the input shaft 24 of a gear reduction assembly 26 by means of a drive shaft 28 and the gear reduction assembly 26 includes an output shaft portion 30 upon which a plurality of pulley wheels 32 are mounted. An intermediate shaft 34 is journalled through a bearing sleeve supported from the support frame 18 and one end of the intermediate shaft 34 has a plurality of pulley wheels 38 mounted thereon aligned with the pulley wheels 32 and driven from the latter by means of a plurality of endless flexible belts 40 trained about the wheels 32 and 38, see FIG. 4. The other end of the intermediate shaft 34 has an adjustable length drive shaft 42 coupled thereto by means of a universal joint 44 and one side of the support frame 18 includes a pair of vertically spaced upper and lower journal blocks 46 and 48 for purpose to be hereinafter more fully set forth.

Figure 3:
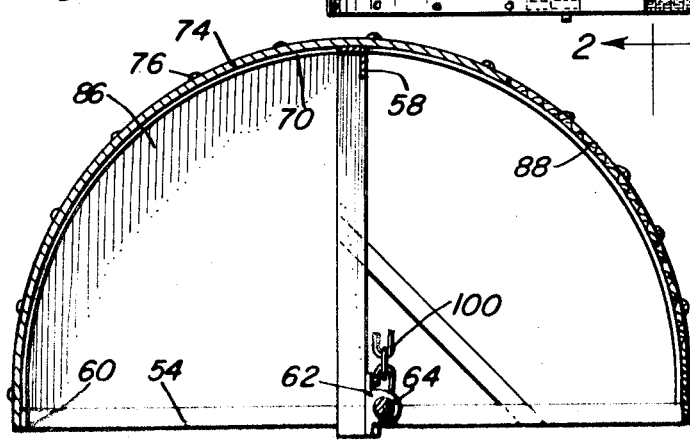
FIG. 3 is an enlarged vertical sectional view, taken substantially upon the plane indicated by the section line 3—3 of FIG. 1.

The ditch cleaner 16 further includes an elongated frame assembly referred to in general by the reference numeral 50 including a pair of opposite end frame sections 52. Each frame section 52 includes a lower horizontal transverse member 54 and an upright end member 56. The upper ends of the end members 56 are innerconnected by means of an upper longitudinal member 58 extending therebetween and one pair of ends of the transverse members 54 are innerconnected by means of a rear longitudinal member 60, see FIG. 3.

The lower ends of the end members 56 include aligned bearing journals 62 and an elongated shaft member 64 is journalled from the journals 62. The shaft member 64 includes diametrically opposite radially outwardly projecting and longitudinally extending flange portions 66 secured thereto and each of the flange portions 66 is provided with a plurality of longitudinally spaced bores 68.

A pair of opposite end generally quarter-circular support and bracing straps 70 are connected between the upper ends of the end members 56 and the rear ends of the transverse members 54 and each of the bracing straps 70 is provided with longitudinally spaced apertures 72 by which a quarter-cylindrical panel 74 is supported from the frame assembly 50 in generally concentric relation with the axis of rotation of the support member 64 by means of fasteners 76 secured through the panel or shield 74 and the apertures 72.

The end of the drive shaft 42 remote from the bearing sleeve 36 is drivingly coupled to the adjacent end of the support member 64 by means of a universal joint 78 and the end member 56 of the frame assembly 50 adjacent the support frame 18 includes vertically spaced journal blocks 80 and 82 vertically registered with the journal blocks 46 and 48. A pivot shaft 84 extends through the journal blocks 46, 48, 80 and 82 and thereby oscillatably supports the frame assembly 50 from the support frame 18 for angular displacement of the frame assembly 50 relative to the support frame 18 about an upstanding axis.

The ends of the frame assembly 50 are closed by means of end panels 86 and the panel 74 includes a forward extension thereof defined by a screen panel 88. Further, the end member 56 from which the journals 80 and 82 are supported includes an anchor portion 90 to which the free end of the piston rod portion 92 of a fluid motor 94 is pivotally attached as at 96. The cylinder portion 98 of the fluid motor 94 is stationarily supported from the support frame 18 whereby extension and retraction of the fluid motor 94 will cause the frame assembly 50 to be oscillated about the upstanding axis defined by the pivot rod or shaft 84.

The elongated support member 64 has at least one elongated flexible flail member 100 supported therefrom. The opposite ends of the flail member, which comprises a link chain section, is provided with hooks 102 or other suitable end members that may be readily removably engaged with the apertures 68 on either of the flange portions 66. If desired, each flange portion 66 may be provided with a flail member 100 and the length of each flail member 100 may be adjusted as desired with its end portions spaced along the support member 64 as desired. In this manner, the flail member or members may be supported from the support member 64 in a manner adapting the ditch cleaner to clean a wide shallow ditch or in a manner adapting the ditch cleaner to clean a narrow and deeper ditch upon rotation of the support member 64.

Figure 1:
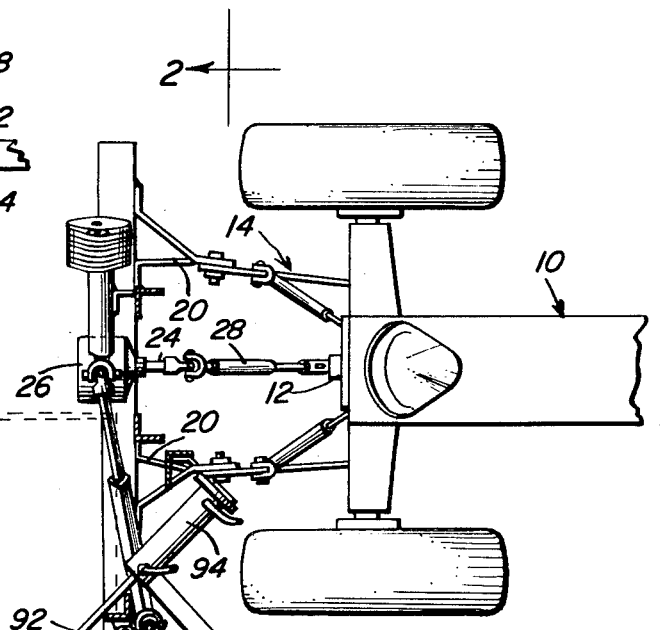
FIG. 1 is a top plan view of the rear portion of a conventional form of farm tractor with the ditch cleaner supported therefrom and projecting laterally outwardly of the right-hand side of the tractor, an alternate retracted position of the ditch cleaner being illustrated in phantom lines.

In transit, the frame assembly 50 is swung to the trailing position thereof illustrated in phantom lines in FIG. 1 of the drawings. When it is desired to clean a ditch such as the ditch 104 in FIG. 2, the fluid motor 94 is actuated to swing the frame assembly 50 to the solid line position thereof illustrated in FIGS. 1 and 2 and the flail member or members 100 may be adjusted on the support member 64 as desired. Then, as the tractor 10 moves along the ditch 104, the support member 64 is driven by the power take-off shaft 12 so as to cause the flail members 100 to swing up rapidly and thus impact with and cut down vegetation within the ditch 104.

The foregoing is considered as illustrative only of the principles of the invention. Further, since numerous modifications and changes will readily occur to those skilled in the art, it is not desired to limit the invention to the exact construction and operation shown and described, and equivalents may be resorted to, falling within the scope of the invention.

What is claimed as new is as follows:

1. A flail-type ditch cleaner including a frame having horizontally spaced portions for positioning above the opposite sides of a ditch to be cleaned and movement along the ditch, an elongated rigid rotary support member rotatable about its longitudinal axis and extending between and journalled from said spaced portions of said frame, and an elongated flexible flail member including coacting means for removably anchoring the opposite end portions of said flail member to selected longitudinally spaced portions of said elongated support member.

2. The combination of claim 1, including a wheeled vehicle having a vertically shiftable support portion, a support structure supported from said support portion for vertical shifting therewith, said frame being elongated with said support member extending longitudinally thereof, and means mounting one end portion of said frame on said support structure for angular displacement of said frame relative to said support structure about an upstanding axis.

3. The combination of claim 2, wherein said vehicle comprises a farm tractor and said support portion comprises an implement lift hitch on said tractor.

4. The combination of claim 3, wherein said tractor includes a power take-off, and drive transmission means drivingly connecting said power take-off to said elongated support member.

5. The combination of claim 2, including means operatively connected between said support structure and said frame for adjustably positioning the latter about said axis.

6. The combination of claim 1, including a generally quarter cylindrical shield supported from said frame generally concentric with the axis of rotation of said elongated support member and enclosing the rear quadrant of the upper arc portion through which said flail member is swingable.

7. The combination of claim 1, wherein said flail member comprises a length of link chain.

8. The combination of claim 2, wherein said vehicle comprises a farm tractor, said support portion comprises an implement lift hitch on said tractor, wherein said tractor includes a power take-off, drive transmission means drivingly connecting said power take-off to said elongated support member, including a generally quarter cylindrical shield supported from said frame generally concentric with the axis of rotation of said elongated support member and enclosing the rear quadrant of the upper arc portion through which said flail member is swingable.

* * * * *